US005208723A

United States Patent [19]

Jenne

[11] Patent Number: 5,208,723

[45] Date of Patent: May 4, 1993

[54] SOLID STATE ELECTRONIC PROTECTOR WITH PRESSURE RELEASE

[75] Inventor: Richard L. Jenne, Attleboro, Mass.

[73] Assignee: Texas Instruments Incorporated, Dallas, Tex.

[21] Appl. No.: 570,073

[22] Filed: Aug. 20, 1990

[51] Int. Cl.[5] .......................... H02H 3/22; H04M 1/74

[52] U.S. Cl. .................................... 361/119; 361/127; 361/56

[58] Field of Search ....................... 361/118, 119, 127; 357/74

[56] References Cited

U.S. PATENT DOCUMENTS

| | | | |
|---|---|---|---|
| 3,560,794 | 2/1971 | Christener | 361/118 |
| 3,568,013 | 3/1971 | Blaha | 317/234 |
| 4,876,713 | 10/1989 | Crosby et al. | 361/119 |

*Primary Examiner*—A. D. Pellinen
*Assistant Examiner*—S. Jackson
*Attorney, Agent, or Firm*—Russell E. Baumann; Richard L. Donaldson; Rene' Grossmann

[57] ABSTRACT

A telephone line overcurrent protector adapted to be mounted on a circuit board is shown having a cup shaped housing in which a PTC element is placed with leads extending out of the housing through apertures in a bottom cover. The bottom cover is formed in one embodiment with a frangible diaphragm to provide guided pressure release upon catastrophic failure of the PTC element, in another embodiment with open apertures in the bottom cover and in yet another embodiment with means to mount a snap out member closing an aperture in the bottom cover, both for the same purpose of providing guided pressure release.

9 Claims, 2 Drawing Sheets

SOLID STATE ELECTRONIC PROTECTOR WITH PRESSURE RELEASE

This invention relates generally to solid state overcurrent protectors and more particularly to positive temperature coefficient (PTC) of resistivity elements used in telephone line surge protection systems.

High voltage and current transients may occur on telephone lines due to lightning strikes, power line switching or the like and can cause deleterious affects on modern telecommunications equipment such as facsimile machines, modems and the like. Zener diodes, gas discharge tubes and MOV's are among the conventional devices which have been used to protect equipment such as relays and transformers from such voltage disturbances; however, none of these are satisfactory for use with sensitive electronic equipment currently in use. Zener diodes, for example, are not suitable for transient suppression since they are designed for DC dissipation having relatively low thermal capacitance and are not designed to handle high pulsed energy. MOV's (metal-oxide varistors) do not have a sharp current initiation and thus their usefulness is limited by the amount of leakage current which can be tolerated. MOV's also degrade as a result of operation which ultimately leads to a loss of protection. Gas discharge tubes do not react quickly enough to provide effective protection to fast moving voltage wave forms.

Recently a new series of surge protectors has become available which provides improved solid state telephone line voltage protection. Known as the TISP series of dual symmetrical transient voltage suppressors, manufactured and sold by Texas Instruments, they comprise two bidirectional suppressor elements connected to a common terminal. These devices will suppress voltage transients between the ring terminal and common, the tip terminal and common and between the ring and tip terminals.

However, these devices do not provide the desired protection from overcurrent which can be caused by various events such as a power line falling across a phone line and feeding high voltage into the telephone line as well as lightning strikes. To provide overcurrent protection it has been conventional to place a fuse element or a PTC element in series with the equipment to be protected. PTC elements have the advantage that they can provide the desired protection for overcurrent and still be operable as long as their energy capability is not exceeded. However, in situations where their energy capability is exceeded the PTC element can catastrophically fail resulting in debris being sprayed over nearby environs. Since it is common to mount the PTC element directly onto a circuit board having other related circuitry such as the voltage transient protector and to mount a number of such boards on a rack in a suitable enclosure a catastrophic failure can result in damaging the adjacent board as well as the board on which the protector is mounted.

It is an object of the present invention to provide a PTC overcurrent protector which will not cause damage to neighboring circuit boards in the event that it suffers a catastrophic failure due to its capability to withstand energy having been exceeded.

Briefly, in accordance with the invention, a housing is provided, generally parallelepiped in configuration, with a bottom cover formed with a frangible diaphragm portion adapted to break upon a selected sudden increase in internal pressure to guide and confine any debris generated by the failure to be deposited onto its own circuit board thereby leaving adjacent circuit boards unaffected. In a second embodiment, useful with protectors which do not need to be sealed, pressure release apertures of a selected size are formed in the bottom cover to effectively confine deposition in a downward direction onto its own circuit board. In another embodiment the cover is formed with an open area surrounded by a seat in which is received a diaphragm member adapted to snap out upon such increase in pressure.

BRIEF DESCRIPTION OF THE DRAWINGS

The present invention will be described with reference to the accompanying drawings, wherein.

DESCRIPTION OF THE PREFERRED EMBODIMENTS

Figure 1:
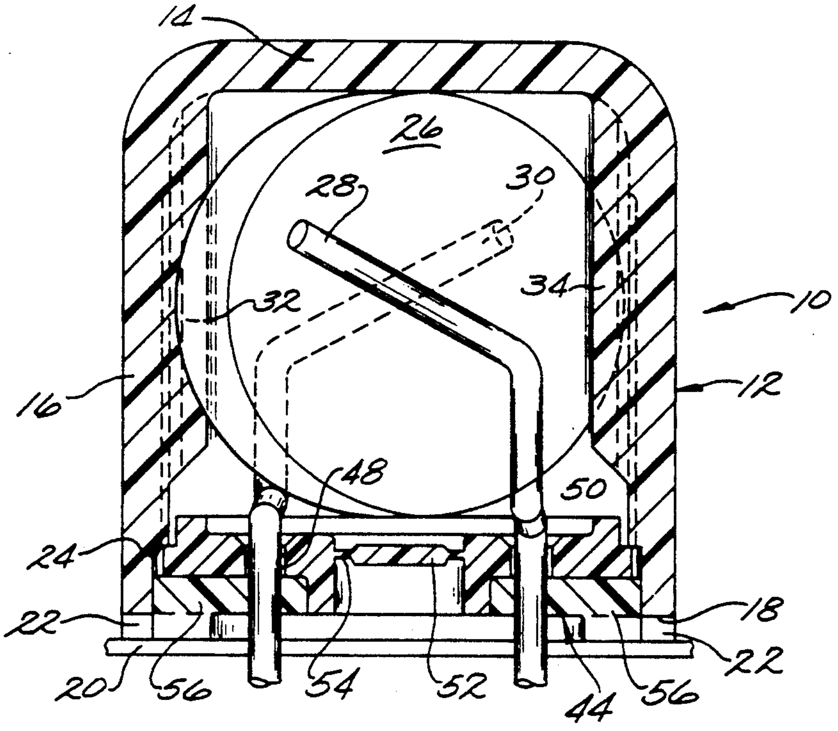
FIGS. 1 and 2 are, respectively, cross sectional elevation views of the front and side of a protector made in accordance with the invention.
Figure 2:
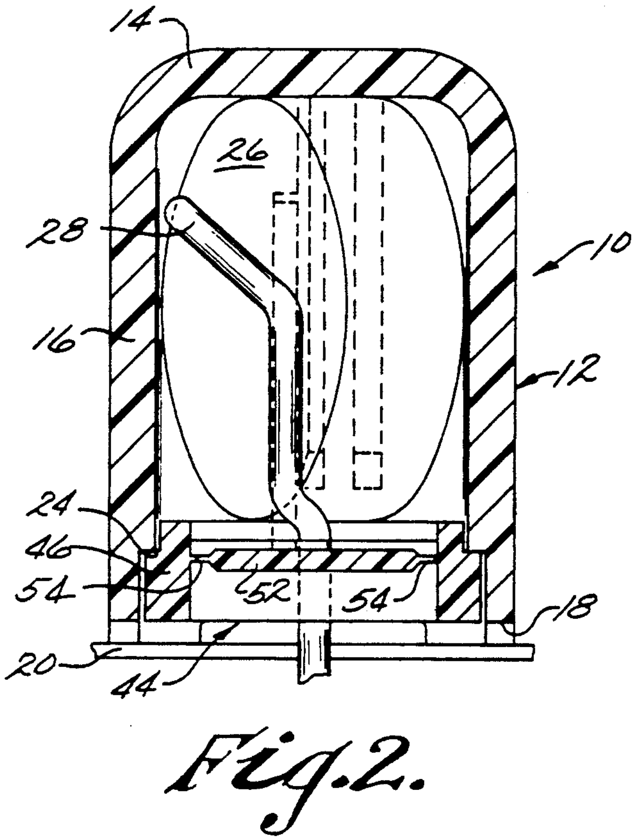
Figure 3:
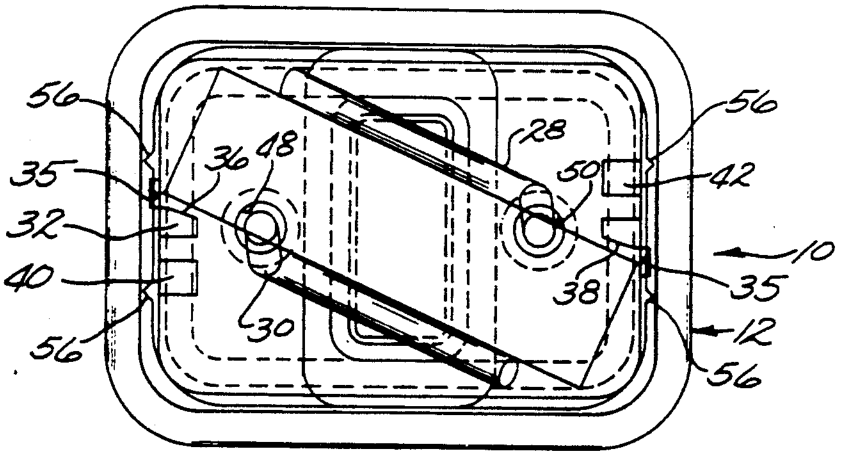
FIG. 3 is a bottom view of the FIG. 1, 2 protector.

With reference to FIGS. 1-3 numeral 10 refers generally to a protector made in accordance with the invention. Protector 10 comprises a generally cup shaped housing 12 having a top end wall 14 and side walls 16 depending therefrom terminating at distal end 18. In order to provide a selected stand off space between the protector and a circuit board 20 on which the protector is mounted end wall 18 is formed with extended portions 22. A ledge 24 is formed in wall 18 on the inside surface and is adapted to serve as a seat for a bottom cover to be discussed below.

Positive temperature coefficient (PTC) of resistivity element 26, a conventional rare earth doped ceramic material such as barium titanate doped with lanthanum or other rare earth is received in the housing. Element 26 is generally cylindrical in configuration with electrically conductive coatings formed on its two end faces. It will be appreciated that other PTC materials and other configurations can be employed if desired. First and second leads 28, 30 are electrically and physically attached to respective end faces of element 26 in a conventional manner, as by soldering or by being biased by a spring force designed into the leads. Leads 28, 30 extend downwardly beyond housing 12 for attachment to circuit board 20.

As best seen in FIG. 3, housing 12 is generally rectangular in cross section and element 26 is disposed therein skewed to extend between two diametrically opposite corners to facilitate providing a central location of leads 28, 30 extending out of housing 12 and to minimize potential shorting problems which could occur if the PTC pill were not skewed with the leads bent to extend longitudinally along essentially half the thickness of the element. In the present structure the leads have only a slight bend in a direction along the width of the pill to effectively obviate any shorting problems. Upwardly extending ribs 32, 34 are formed on the inside surface of side walls 16 in the center of the short sides of the rectangle with tapered surfaces 36, 38 respectively serving to guide the element into its desired location upon assembly. Upwardly extending ribs 40, 42 also formed on the inside surface of side wall 16 spaced from ribs 32, 34 respectively insure that element 26 is not placed in housing 12 in the opposite skewed position. Channels 35 are formed in side wall 16 to accommodate a slightly larger PTC element if desired.

Bottom cover 44 comprises a frame 46 configured to be received on seat 24 of side wall 16. Spaced apertures 48, 50 extend through frame 46 to accommodate leads 30, 28 respectively. A center diaphragm portion 52 is integrally connected to portion 46 through frangible web 54. It will be noted that the wall portion of frame 46 to which web 54 is attached is elongated to thereby guide pressure relief in a downward direction and that web 54 is located more closely adjacent the inner side than the outer to enhance the guiding action. Cover 44 preferably is provided with a plurality of knife edge ribs (not shown) to facilitate press fitting of cover 44 during assembly and preferably is ultrasonically welded to the housing. Finally, electrically insulating epoxy 56 is disposed around the leads to seal the protector. If desired the leads can be heat sealed into the cover rather than using epoxy.

In the event that the PTC element is exposed to an excessive voltage and as a result suffers catastrophic failure the frangible web 54 will rupture due to the sudden increase in pressure with concomitant debris generated by the failure deposited on and confined to its own circuit board 20 and thereby avoid damage to any adjacent circuit board in the rack. The web is weak enough to break upon catastrophic failure but strong enough to withstand a circuit board wash cycle.

Figure 4:
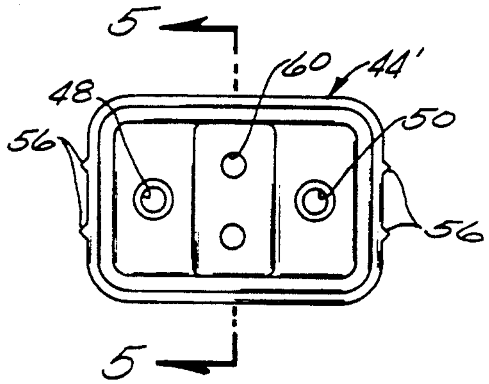
FIG. 4 is a bottom view of an alternate bottom cover which can be used in a protector made in accordance with the invention.
Figure 5:
FIG. 5 is a cross section taken on line 5—5 of FIG. 4.
Figure 6:
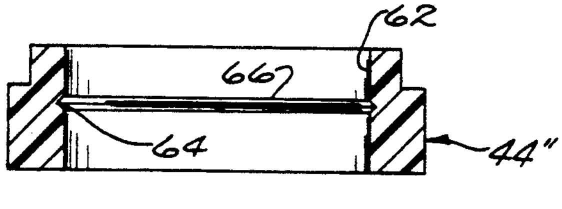
FIG. 6 is a cross sectional view of another alternate bottom cover which can be used in a protector made in accordance with the invention.

In applications in which it is not required to seal the protector suitable pressure relief can be obtained, as shown in FIGS. 4 and 5, by forming one or more apertures 60, two being shown, in cover 44' or, as shown in FIG. 6, by forming cover 44' with a central opening 62 having a groove 64 extending around the internal periphery of the cover and having a thin member 66 received in the groove adapted to snap out upon a selected increase in pressure.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A telephone line overcurrent protector comprising a generally cup shaped housing formed of electrically insulating material having a top wall and side wall depending therefrom for mounting on a circuit board, said side walls having a distal free end and a projection formed on a portion of the distal free end to form a selected stand off space between the protector and said circuit board when the protector is mounted, bottom cover means received on the side walls, an element of positive temperature coefficient (PTC) of resistivity disposed in the housing, the element being generally cylindrical in configuration with first and second end faces, first and second wire leads electrically coupled to the respective first and second end faces and extending out of the housing through respective apertures formed in the cover means for connecting to said circuit board, the cover means formed with pressure release means to specifically direct and confine any debris generated by a catastrophic failure of the element to a preselected location on the circuit board.

2. A telephone line overcurrent protector according to claim 1 in which the cover means includes a frame portion defining a central area, a diaphragm having an outer periphery integrally attached to the frame along its entire outer periphery thereof through a frangible web selected to break upon being subjected to a selected increase of pressure on one side thereof.

3. A telephone line overcurrent protector according to claim 2 in which epoxy is placed around the leads on the cover means to provide a seal.

4. A telephone line overcurrent protector according to claim 3 in which the cover means has an outer surface and has a recessed area in its outer surface.

5. A telephone line overcurrent protector according to claim 2 in which the frame has an inner and outer surface and the web is attached more closely adjacent to the inner surface than the outer to facilitate guiding action of pressure release upon catastrophic failure of the element.

6. A telephone line overcurrent protector according to claim 1 in which the cover means has at least one aperture therethrough to serve as a pressure release.

7. A telephone line overcurrent protector according to claim 1 in which the cover means includes a frame portion with a wall defining a central opening and a groove is formed in the frame wall extending therearound, and a thin member having an outer periphery configured to be closely received in the groove is received in the groove to close the central opening whereby upon a selected increase in pressure within the housing the member will snap out of the frame.

8. A telephone line overcurrent protector according to claim 1 in which a cross section of the housing taken on a plane generally parallel with its top and bottom is rectangular and the element is received in the housing with its cylindrical side facing the top wall of the housing, the element being skewed relative to the rectangular side walls so that the cylindrical side faces diametrically opposed corners of the rectangle to allow the first and second leads to extend out of the housing through apertures which are centrally located with minimal bending of the leads in a direction extending from one end of the element to the other.

9. A telephone line overcurrent protector according to claim 8 in which first and second pairs of ribs are provided in the side walls of the housing, the first pair serving to guide the PTC element in its selected skewed position and the second pair preventing the PTC element from moving into the opposite skewed position upon assembly.

* * * * *